United States Patent
Nemoto et al.

(10) Patent No.: US 10,685,651 B2
(45) Date of Patent: Jun. 16, 2020

(54) INFORMATION PROCESSING APPARATUS

(71) Applicant: FUJI XEROX CO., LTD., Tokyo (JP)

(72) Inventors: Yoshihiko Nemoto, Kanagawa (JP); Kengo Tokuchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 145 days.

(21) Appl. No.: 15/915,713

(22) Filed: Mar. 8, 2018

(65) Prior Publication Data
US 2019/0013022 A1 Jan. 10, 2019

(30) Foreign Application Priority Data
Jul. 4, 2017 (JP) .................. 2017-131009

(51) Int. Cl.
*G10L 15/00* (2013.01)
*G10L 15/22* (2006.01)
*G10L 15/25* (2013.01)
*G10L 25/78* (2013.01)

(52) U.S. Cl.
CPC .............. *G10L 15/22* (2013.01); *G10L 15/25* (2013.01); *G10L 25/78* (2013.01); *G10L 2015/223* (2013.01)

(58) Field of Classification Search
CPC ..... G06K 9/00335; G10L 17/06; G10L 17/22; G10L 2021/02166; G10L 15/00; G10L 15/25; G10L 17/00; G10L 17/005; G10L 25/78
See application file for complete search history.

(56) References Cited

U.S. PATENT DOCUMENTS 8,831,954 B2 * 9/2014 Bruekers ................. G10L 15/20 704/275
2006/0104454 A1 * 5/2006 Guitarte Perez ........ G06F 3/011 381/71.6

FOREIGN PATENT DOCUMENTS

JP 2011-18272 A 1/2011

* cited by examiner

*Primary Examiner* — Edgar X Guerra-Erazo
(74) *Attorney, Agent, or Firm* — Sughrue Mion, PLLC

(57) ABSTRACT

An information processing apparatus includes an acquiring unit, a detecting unit, and a voice command unit. The acquiring unit acquires voice information of a speaker. The detecting unit detects operation related to speech by the speaker. The voice command unit performs a voice command in accordance with the voice information acquired by the acquiring unit after the detecting unit detects the operation.

12 Claims, 7 Drawing Sheets

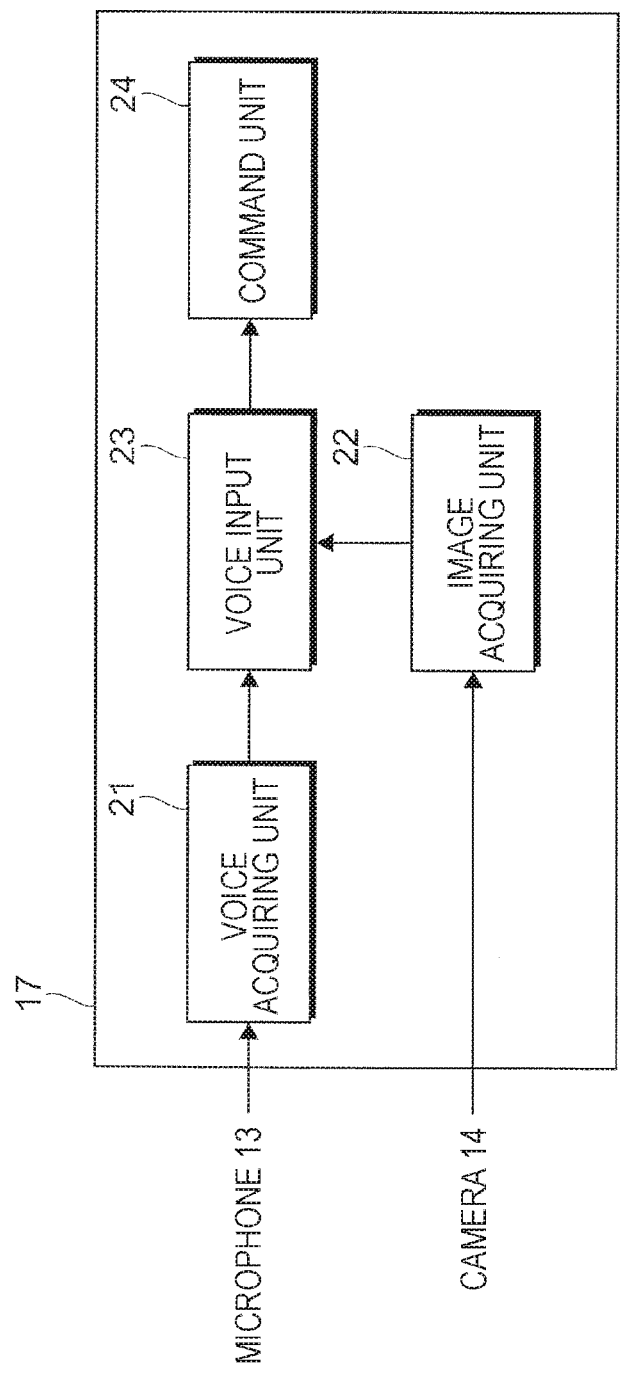

INFORMATION PROCESSING APPARATUS

CROSS-REFERENCE TO RELATED APPLICATIONS

This application is based on and claims priority under 35 USC 119 from Japanese Patent Application No. 2017-131009 filed Jul. 4, 2017.

BACKGROUND

Technical Field

The present invention relates to information processing apparatuses.

SUMMARY

According to an aspect of the invention, there is provided an information processing apparatus including an acquiring unit, a detecting unit, and a voice command unit. The acquiring unit acquires voice information of a speaker. The detecting unit detects operation related to speech by the speaker. The voice command unit performs a voice command in accordance with the voice information acquired by the acquiring unit after the detecting unit detects the operation.

BRIEF DESCRIPTION OF THE DRAWINGS

Exemplary embodiments of the present invention will be described in detail based on the following figures, wherein:

FIG. 3 is a functional block diagram that realizes a simple input function according to this exemplary embodiment;

DETAILED DESCRIPTION

Exemplary embodiments of the present invention will be described below with reference to the appended drawings.

First Exemplary Embodiment

Figure 1:
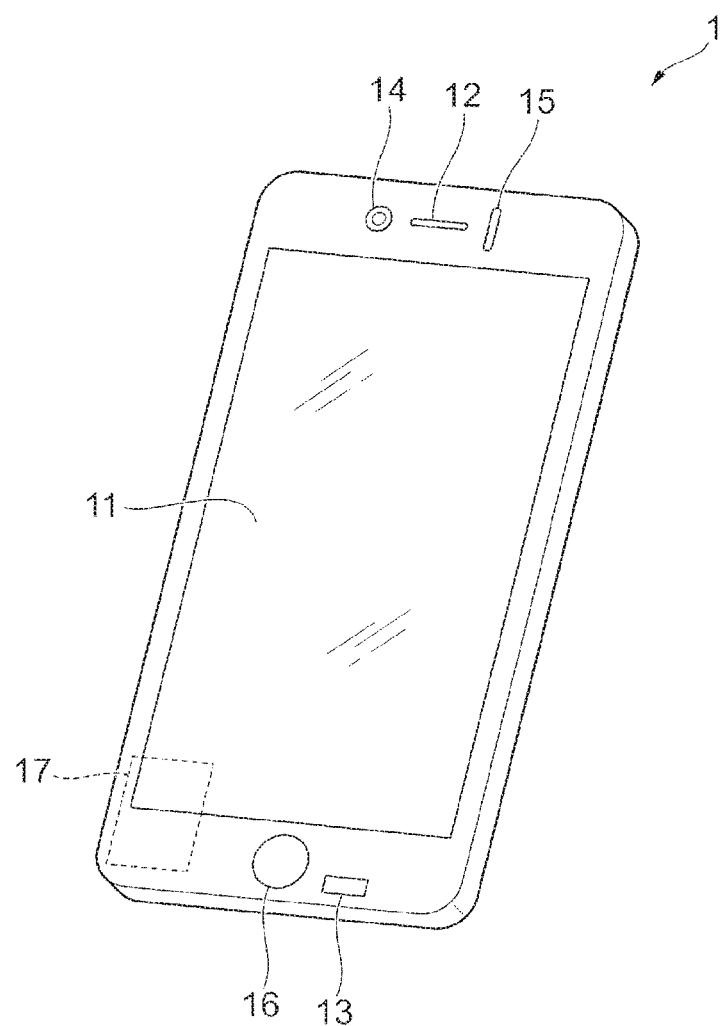
FIG. 1 is an overall view of a terminal apparatus according to a first exemplary embodiment.

FIG. 1 is an overall view of a terminal apparatus 1 according to a first exemplary embodiment.

As shown in FIG. 1, the terminal apparatus 1 according to this exemplary embodiment includes a touchscreen 11 that displays an image and also receives user's operation, a loudspeaker 12 that outputs sound, a microphone 13 that acquires voice information, a camera 14 that acquires an image of a subject, a distance sensor 15 that detects a target object by using infrared radiation, a control button 16 that receives user's operation, and a controller 17 that controls the entire terminal apparatus 1.

The touchscreen 11 displays an image, such as a still image or a moving image, based on control performed by the controller 17. The touchscreen 11 also detects a touching operation performed by a user using his/her finger. When the user performs a touching operation on the touchscreen 11, the terminal apparatus 1 executes a predetermined process in accordance with the touching operation.

The touchscreen 11 may be, for example, a liquid crystal display or an organic electroluminescence (EL) display. The touchscreen 11 may be of any one of various types, such as an electrostatic capacitance type and a resistive film type.

The loudspeaker 12 causes a diaphragm to vibrate based on an electric signal so as to output sound. The loudspeaker 12 according to this exemplary embodiment is disposed at the upper side of the terminal apparatus 1. The loudspeaker 12 is to be positioned near one of user's ears in a state where the user manually holds the terminal apparatus 1 close to his/her face.

The microphone 13 (i.e., an example of an acquiring unit) converts the movement of a diaphragm, which is to be vibrated by sound, into an electric signal so as to generate voice information. The microphone 13 according to this exemplary embodiment is disposed at the lower side of the terminal apparatus 1 (i.e., at the opposite side from the loudspeaker 12 in the up-down direction of the terminal apparatus 1). The microphone 13 is to be positioned near the user's mouth in a state where the user manually holds the terminal apparatus 1 close to his/her face.

With respect to the front and rear sides of the terminal apparatus 1, the camera 14 (i.e., an example of a detecting unit) is provided at the same side as the touchscreen 11, the loudspeaker 12, and the microphone 13. The camera 14 acquires an image of a subject located at the side where the camera 14 is provided.

The distance sensor 15 (i.e., an example of a detecting unit) integrally has an infrared light emitting unit and an infrared light receiving unit. The distance sensor 15 detects the distance to a target object in accordance with a change in output voltage caused when infrared light emitted from the light emitting unit is reflected by the target object and is received by the light receiving unit.

Alternatively, the distance sensor 15 may detect the distance to a target object by using light having a predetermined wavelength instead of using infrared light.

The control button 16 has a mechanical structure. The control button 16 receives user's operation independently from the touchscreen 11. In the terminal apparatus 1 according to this exemplary embodiment, for example, a home screen image is displayed on the touchscreen 11 when the control button 16 is pressed.

The controller 17 (i.e., an example of a voice command unit) performs overall control of the entire terminal apparatus 1. For example, the controller 17 performs various types of control, such as power control of the terminal apparatus 1, display control of an image to be displayed on the touchscreen 11, and communication control via a network.

Next, the hardware configuration of the terminal apparatus 1 will be described.

Figure 2:
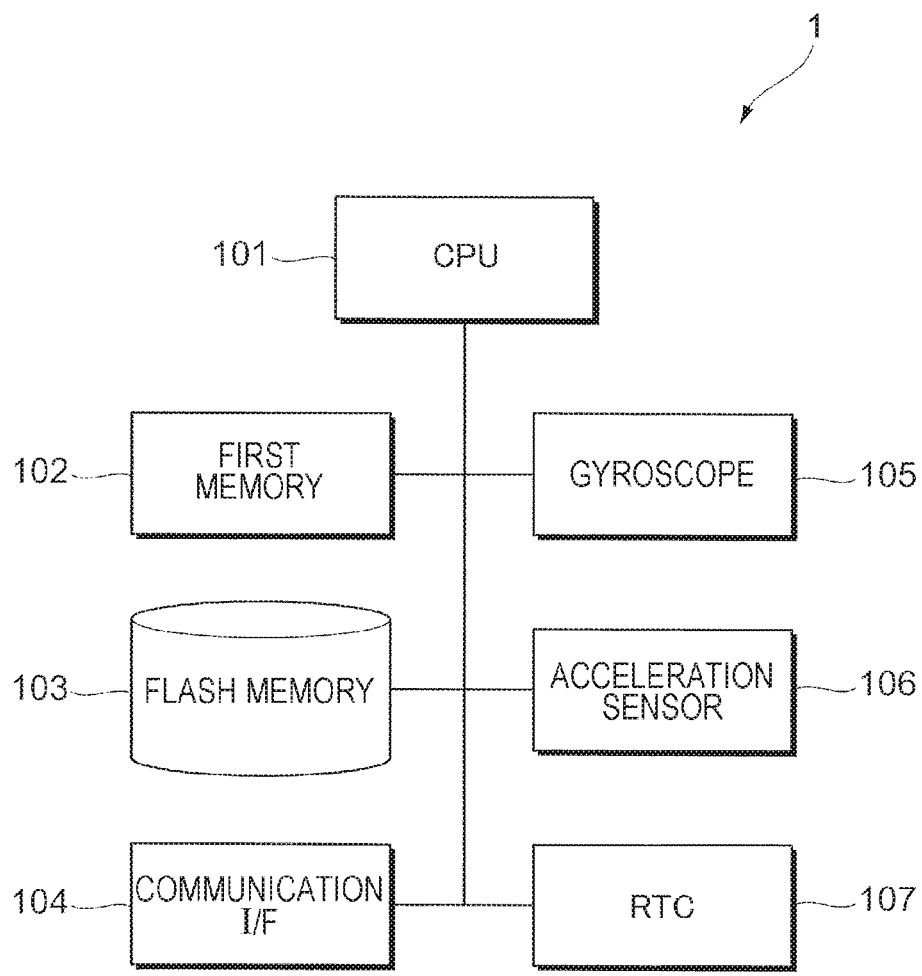
FIG. 2 illustrates an example of a hardware configuration of the terminal apparatus according to the first exemplary embodiment.

FIG. 2 illustrates an example of a hardware configuration of the terminal apparatus 1 according to the first exemplary embodiment.

As shown in FIG. 2, the terminal apparatus 1 includes a central processing unit (CPU) 101 as an arithmetic unit, and a first memory 102 and a flash memory 103 as storage units.

The terminal apparatus 1 also includes a communication interface (I/F) 104 for communicating with an external unit, a gyroscope 105 that detects the orientation of the terminal apparatus 1, an acceleration sensor 106 that detects the movement of the terminal apparatus 1, and a real-time clock (RTC) 107 that measures time.

The CPU 101 executes various types of programs, such as an operating system (OS) and application software, so as to realize various functions of the terminal apparatus 1. The first memory 102 is a storage area used for storing various types of programs and data to be used for executing the programs. The flash memory 103 is a storage area used for storing data to be input to the various types of programs and data to be output from the various types of programs.

Based on control by the controller 17, the terminal apparatus 1 having the above-described configuration is capable of executing various types of operations usable by the user, such as a calling operation using the loudspeaker 12, the microphone 13, and the communication I/F 104, an Internet operation using the communication I/F 104 and the touchscreen 11, a photographing operation using the camera 14 and the touchscreen 11, and a still-image and moving-image browsing operation and a gaming operation using the touchscreen 11.

In the terminal apparatus 1, for example, text information is input by the user via a keyboard image or a numerical keypad image displayed on the touchscreen 11. Moreover, this exemplary embodiment has a voice input function with which text is input via the microphone 13 from a voice output by the user.

Furthermore, the terminal apparatus 1 according to this exemplary embodiment has a voice command function with which various types of operations executable in the terminal apparatus 1 are executed based on the text input in accordance with the voice input function.

When a voice command is to be performed in the related art, a speaker has to perform a specific operation on the terminal apparatus 1 at the time of starting and ending the voice input.

For example, when an Internet search is to be performed as a voice command by using the voice input function, the speaker first operates an icon image displayed on the touchscreen 11 so as to activate a browser to be used for the Internet search. Subsequently, in order to start the voice input, a voice-input start button displayed on the touchscreen 11 has to be operated. When ending the voice input, a voice-input end button displayed on the touchscreen 11 has to be operated.

When ending the voice input, there is a case where the operation of the voice-input end button is not requested. In this case, the voice input may undesirably continue in the terminal apparatus 1 even when the speaker stops speaking, or noise, such as another person's voice or ambient noise, may be reflected on the input text.

In contrast, the terminal apparatus 1 according to this exemplary embodiment has a simple input function in which, when a voice is input, the terminal apparatus 1 performs operation related to the speech output by the speaker, that is, detects the state of the speaker outputting the speech, so as to eliminate the need for an operation performed in the terminal apparatus 1 other than the speech output by the speaker when the voice input starts and/or ends.

FIG. 3 is a functional block diagram that realizes the simple input function according to this exemplary embodiment.

Figure 4B:
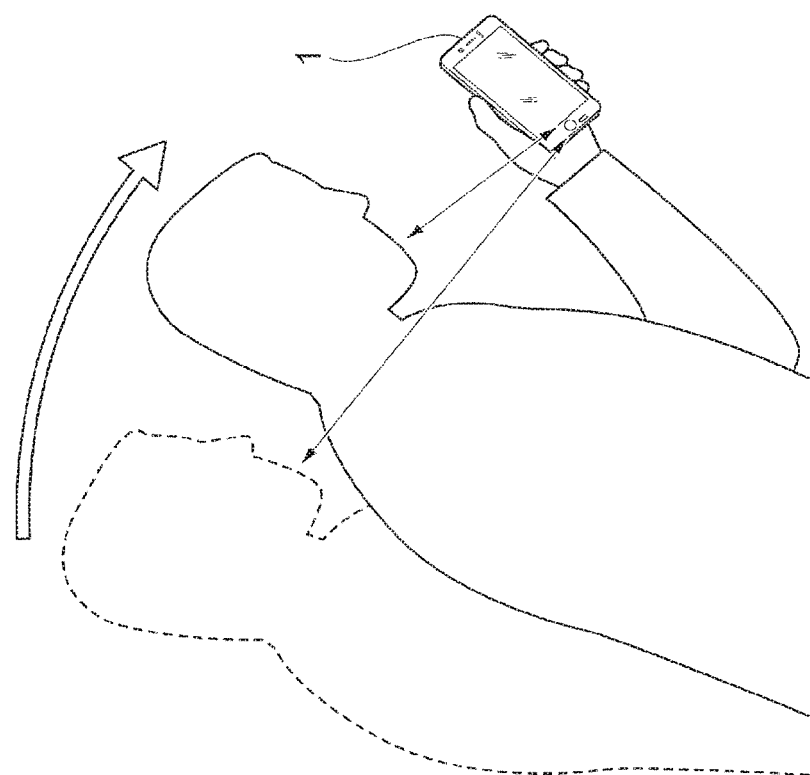
FIGS. 4A and 4B illustrate a process of a voice command performed in the terminal apparatus.
Figure 4A:
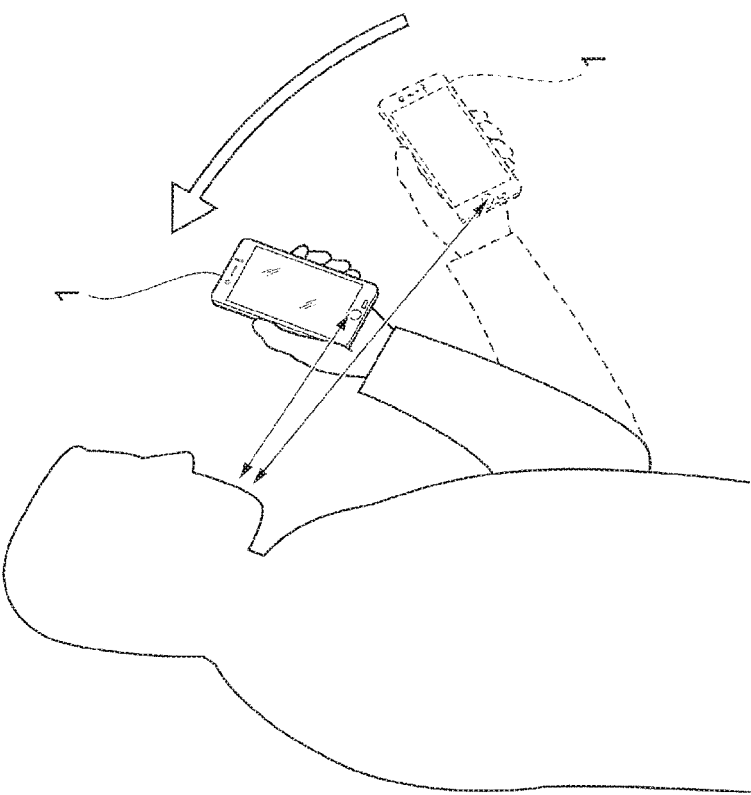

FIGS. 4A and 4B illustrate a process of a voice command performed in the terminal apparatus 1.

Figure 5A:
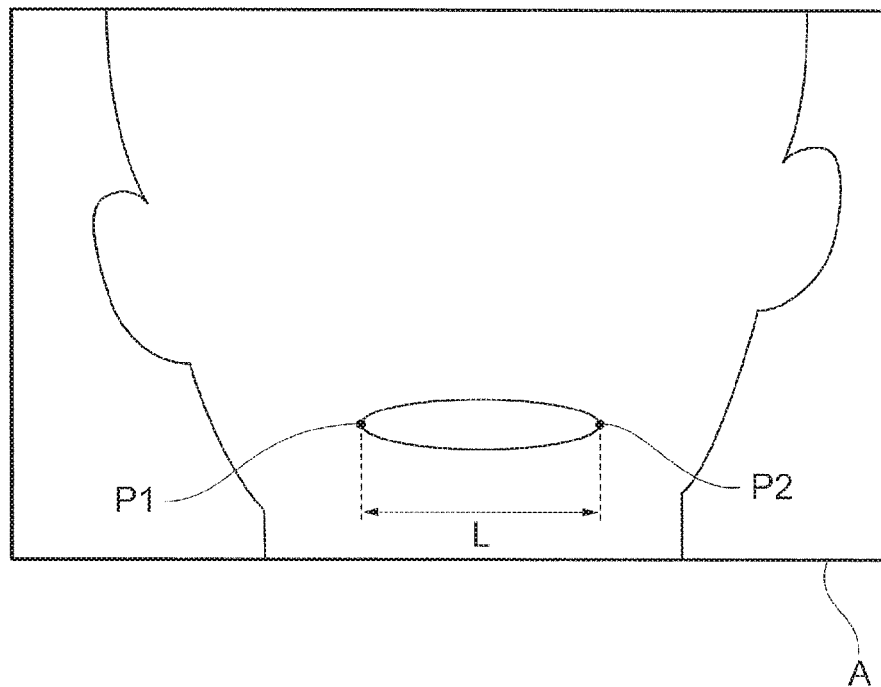
FIGS. 5A and 5B illustrate an example of images acquired by a camera when a voice command is performed in the terminal apparatus.
Figure 5B:
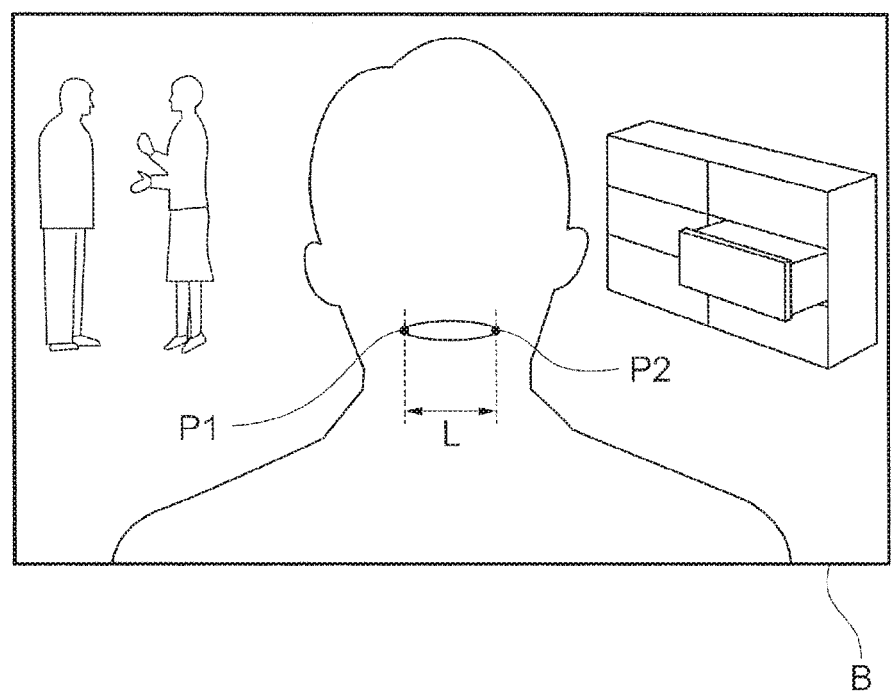

FIGS. 5A and 5B illustrate an example of images acquired by a camera when a voice command is performed in the terminal apparatus 1.

As shown in FIG. 3, the controller 17 has a voice acquiring unit 21 that acquires voice information, an image acquiring unit 22 that acquires image information, a voice input unit 23 that converts the voice information into text information, and a command unit 24 that commands the terminal apparatus 1 to operate.

In this exemplary embodiment, the terminal apparatus 1 detects operation related to speech output by a speaker based on an image of the speaker performing an operation on the terminal apparatus 1, and performs a voice command in accordance with the voice information.

The voice acquiring unit 21 acquires voice information from the microphone 13. Then, the voice acquiring unit 21 refers to the RTC 107 to search for time information about the time at which the voice information is generated by the microphone 13, so as to generate time-series voice information. Then, the voice acquiring unit 21 transmits the time-series voice information to the voice input unit 23.

Furthermore, the voice acquiring unit 21 according to this exemplary embodiment determines a period (referred to as "specific sound-volume-level period" hereinafter) in which the time-series voice information is in a range of a predetermined sound volume level. In this exemplary embodiment, the predetermined sound volume level is a level set in advance based on a case where the speaker speaks at a normal voice level from about 10 cm away from the terminal apparatus 1.

The voice acquiring unit 21 then transmits the information about the specific sound-volume-level period to the voice input unit 23.

The image acquiring unit 22 acquires image information acquired by the camera 14 when a voice command is to be performed. In this case, the image acquiring unit 22 transmits time information, which is acquired when the image information is acquired, together with the image information to the voice input unit 23. Specifically, the image acquiring unit 22 refers to the RTC 107 to search for time information about the time at which the image information is generated by the camera 14, so as to generate time-series image information.

Furthermore, from the acquired image information, the image acquiring unit 22 detects an image of the mouth of the person (i.e., the speaker) who is speaking. Then, the image acquiring unit 22 determines a time period in which the image of the mouth is detected as image information.

If the speaker is manually holding the terminal apparatus 1 when the speaker inputs a voice, the speaker brings the terminal apparatus 1 close to his/her face, as shown in FIG. 4A. Furthermore, if the speaking is manually holding the terminal apparatus 1 or if the terminal apparatus 1 is set on, for example, a table when the speaker inputs a voice, the speaker brings his/her face close to the terminal apparatus 1, as shown in FIG. 4B.

Therefore, when the speaker inputs a voice, an image A (image information) acquired by the camera 14 is substantially the image of the speaker's mouth, as shown in FIG. 5A, such that the image A is substantially occupied by the image of the mouth. In contrast, images of elements other than the speaker's mouth are less likely to be included in the image information.

In the first exemplary embodiment, when the image of the mouth is detected as image information, it is determined that the speaker has started speaking.

On the other hand, when the speaker ends the voice input, if the speaker is manually holding the terminal apparatus 1, the speaker moves the terminal apparatus 1 away from his/her face, as shown in FIG. 4A. Furthermore, if the speaking is manually holding the terminal apparatus 1 or if the terminal apparatus 1 is set on, for example, a table when the speaker ends the voice input, the speaker moves his/her face away from the terminal apparatus 1, as shown in FIG. 4B.

Therefore, when the speaker ends the voice input, as shown in FIG. 5B, an image B (image information) acquired by the camera 14 may include not only the image of the speaker's mouth but also images of elements other than the speaker's mouth, or may include an image not including the mouth or the face of the speaker to begin with.

In the first exemplary embodiment, when the image of the mouth is no longer detected as image information, it is determined that the speaker has ended the speech.

Accordingly, in the first exemplary embodiment, the time period from when the image of the mouth is detected to when the image of the mouth is no longer detected is determined as a speech period. The image acquiring unit 22 transmits the information about the speech period to the voice input unit 23.

The voice input unit 23 acquires the voice information acquired by the microphone 13. Then, the voice input unit 23 generates text information by converting the voice information in a period corresponding to the speech period into text. Specifically, the voice input unit 23 performs a process for converting the voice information, which is acquired in a period from when the speech-related operation is detected to when the speech-related operation is no longer detected, into text information.

The voice input unit 23 may use various types of models related to voice input (voice recognition), such as an acoustic model and a linguistic model.

Furthermore, in addition to the information about the speech period, the voice input unit 23 according to this exemplary embodiment generates the text information while also taking into account the specific sound-volume-level period acquired from the voice acquiring unit 21. Specifically, a process for converting the voice information in a period corresponding to the specific sound-volume-level period into text information is performed.

The process for determining the timing for starting the voice input and the timing for ending the voice input while adding the information about the specific sound-volume-level period to the information about the speech period is also applied to other exemplary embodiments. However, the voice input unit 23 prioritizes the information about the speech period over the information about the specific sound-volume-level period.

Then, the voice input unit 23 transmits the generated text information to the command unit 24.

The command unit 24 causes each component of the terminal apparatus 1 to operate based on the text information acquired from the voice input unit 23. Specifically, the command unit 24 causes each component of the terminal apparatus 1 to execute its function based on the text information.

The functions of the terminal apparatus 1 to be executed by the command unit 24 are as follows.

For example, if the command unit 24 acquires text information in a state where an Internet search application is activated, the command unit 24 causes the touchscreen 11 to display a search word designated in accordance with the text information and also executes an Internet search with respect to the search word.

Furthermore, if the contents designated in accordance with the text information are related to the functions realized by using the components of the terminal apparatus 1, the command unit 24 sets the functions in a usable state. Specifically, if the text information contains the contents "call Mr./Ms. _____", the command unit 24 performs a calling operation by activating the communication I/F 104 to make a call to Mr./Ms. _____. If the text information contains the contents "set alarm to _____", the command unit 24 causes the loudspeaker 12 to output a predetermined alarm sound at _____.

Next, the flow of operation of the simple input function will be described in detail.

Figure 6:
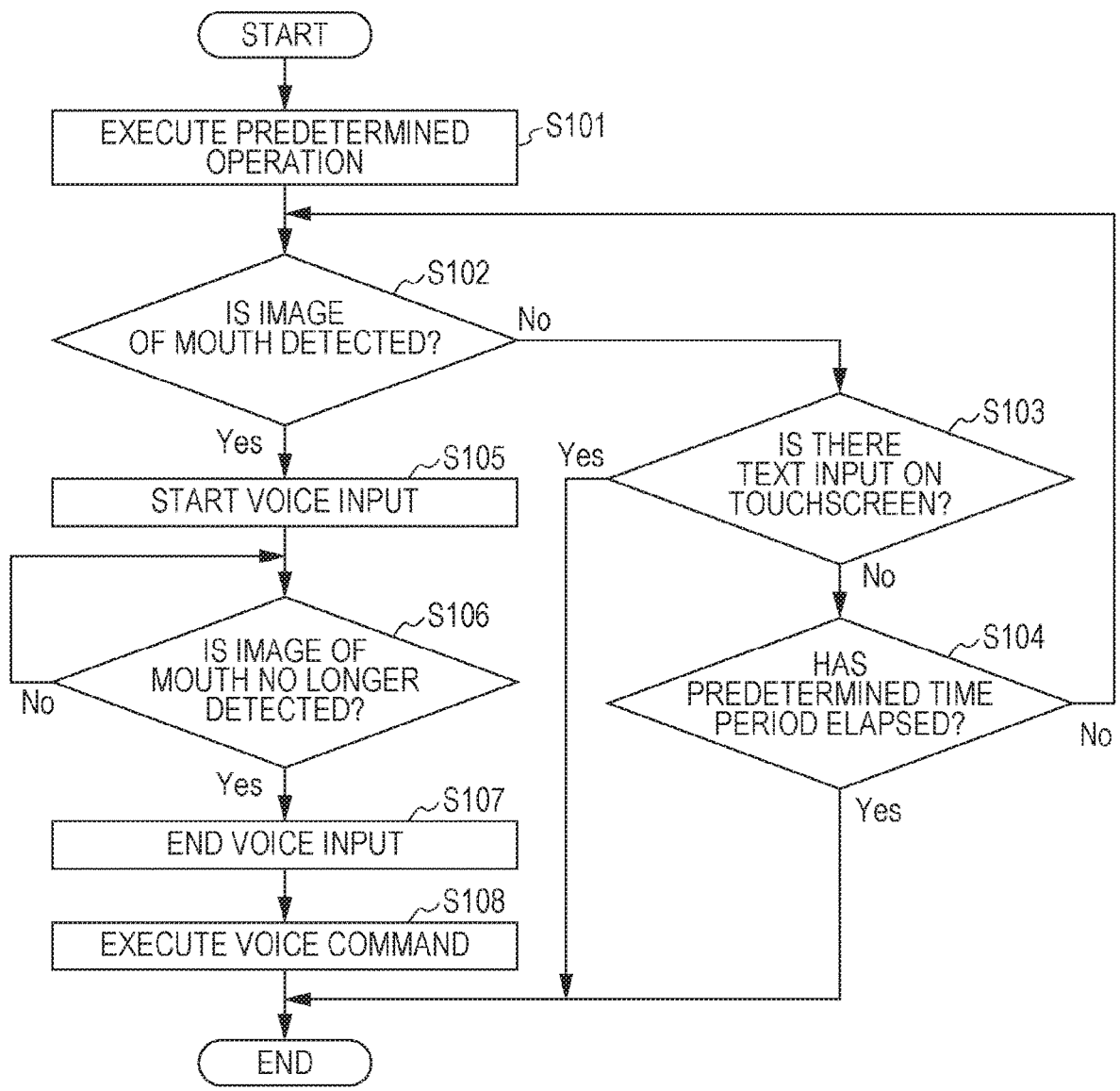
FIG. 6 is a flowchart illustrating the operation of the simple input function according to the first exemplary embodiment.

FIG. 6 is a flowchart illustrating the operation of the simple input function according to the first exemplary embodiment.

The following description relates to an example of a voice command for executing an Internet search with respect to a search word input in accordance with voice input.

First, in step S101, the speaker performs a predetermined operation. In this example, the speaker presses an icon displayed on the touchscreen 11 in step S101 so as to activate a browser to be used for the Internet search.

Then, the speaker brings his/her mouth close to the terminal apparatus 1 so as to input a voice. In step S102, the terminal apparatus 1 determines whether or not an image of the mouth is detected by the camera 14. If an image of the mouth is not detected in step S102 (No in step S102), it is determined in step S103 whether or not text is input by a touching operation performed on the touchscreen 11. If text is input (Yes in step S103), the process of the simple input function ends.

If an image of the mouth is not detected (No in step S102) and text is not input (No in step S103), it is determined in step S104 whether or not a predetermined time period has elapsed.

If the predetermined time period has not elapsed (No in step S104), the process returns to step S102 where it is determined whether or not an image of the mouth is detected.

If the predetermined time period has elapsed (Yes in step S104), the process of the simple input function ends.

If an image of the mouth is detected in step S102 (Yes in step S102), voice input using voice information acquired by the microphone 13 at that point is started in step S105.

Subsequently, in step S106, it is determined whether or not the image of the mouth is no longer detected. If the image of the mouth is still detected in step S106 (No in step S106), the voice input using the voice information acquired by the microphone 13 continues.

If the image of the mouth is no longer detected in step S106 (Yes in step S106), the acquisition of the voice information from the microphone 13 is terminated at that point so as to end the voice input in step S107.

In this exemplary embodiment, after the voice input starts, a predetermined voice command is executed in step S108 by using the voice information acquired from the microphone 13 until the voice input ends. In this example, for example, an Internet search is executed by using a search word converted from the voice information acquired from when the voice input starts to when the voice input ends.

When performing the voice command, the predetermined operation in step S101 does not necessarily have to be performed. For example, the image acquiring unit 22 may be continuously activated, and the voice input may be started when an image of the mouth is detected. In this case, a voice command (i.e., voice input) is started even if the speaker does not perform a predetermined operation, such as operating an icon on the touchscreen 11 of the terminal apparatus 1.

As described above, in the first exemplary embodiment, the speaker does not have to perform an operation other than simply speaking into the microphone 13 of the terminal apparatus 1 when starting and ending voice input, such that voice input is automatically completed.

First Modification

Next, a first modification will be described.

The determination of a speech period based on detection of an image of a speaker by the image acquiring unit 22 is not limited to the above-described example in which the speech period is determined based on detection of an image of the mouth. For example, the image acquiring unit 22 may determine the speech period by detecting the movement of the speaker's mouth.

Specifically, the image acquiring unit 22 detects the amount of movement in the image of the speaker's mouth. For example, the image acquiring unit 22 according to the first modification determines the amount of movement in a distinctive area of the mouth, such as the upper lip or the lower lip. Then, the image acquiring unit 22 sets a period in which the image of the mouth is detected as having a predetermined amount of movement or more as the speech period. More specifically, the image acquiring unit 22 sets the time point at which it is determined that the movement in the mouth reaches the predetermined amount of movement or more based on the image of the speaker's mouth as a timing for starting the voice input. Furthermore, after the voice input is started, the image acquiring unit 22 sets the time point at which it is determined that the movement in the mouth becomes less than the predetermined amount of movement as a timing for ending the voice input.

Accordingly, in the first modification, the image acquiring unit 22 directly and dynamically detects that the speaker is speaking.

Second Exemplary Embodiment

Next, a simple input function of a terminal apparatus 1 according to a second exemplary embodiment will be described. In the second exemplary embodiment, components similar to those in the first exemplary embodiment are given the same reference signs, and detailed descriptions thereof are omitted.

In the terminal apparatus 1 according to the second exemplary embodiment, operation related to speech output by a speaker is detected based on the distance between the terminal apparatus 1 and the speaker.

As described above with reference to FIGS. 4A and 4B, in a case where a voice is to be input to the terminal apparatus 1, the distance between the terminal apparatus 1 and the speaker decreases. In the second exemplary embodiment, a speech period is determined by detecting the distance between the terminal apparatus 1 and the speaker.

In the second exemplary embodiment, the terminal apparatus 1 detects the distance between the terminal apparatus 1 and the speaker by using the distance sensor 15. Then, the terminal apparatus 1 according to the second exemplary embodiment sets a period in which the distance between the terminal apparatus 1 and the speaker is shorter than a predetermined distance as the speech period. More specifically, when a voice command is to be performed, the terminal apparatus 1 sets the time point at which the distance sensor 15 determines that the distance between the terminal apparatus 1 and the target object (i.e., the speaker) is shorter than the predetermined distance as a timing for starting the voice input. Moreover, after the voice input is started, the terminal apparatus 1 sets the time point at which the distance sensor 15 determines that the distance between the terminal apparatus 1 and the target object (i.e., the speaker) is longer than or equal to the predetermined distance as a timing for ending the voice input.

Accordingly, in the second exemplary embodiment, the speaker does not have to perform an operation other than simply speaking into the microphone 13 of the terminal apparatus 1 when starting and ending voice input, such that voice input is automatically completed.

Second Modification

Next, a second modification will be described.

Although the distance sensor 15 is used in the above-described example to detect operation related to speech output by a speaker based on a change in the distance between the terminal apparatus 1 and the speaker, the exemplary embodiment is not limited to this example.

The terminal apparatus 1 according to the second modification detects a change in the distance between the terminal apparatus 1 and the speaker based on image information acquired by the camera 14. Specifically, when a voice command is to be performed, the terminal apparatus 1 according to the second modification determines the speech period by detecting a change in the distance between the speaker and the terminal apparatus 1 based on a change in the length determinable in the image information of the camera 14.

As shown in FIGS. 5A and 5B, for example, the terminal apparatus 1 according to the second modification determines the length of a gap L between a right mouth corner P1 and a left mouth corner P2 from an image of the speaker's mouth. The gap L between the mouth corners in the image acquired by the camera 14 is proportional to the distance between the terminal apparatus 1 and the speaker. The terminal apparatus 1 according to the second modification sets the time point at which it is determined that the gap L between the mouth corners is larger than a predetermined distance as a timing for starting voice input. Moreover, after the voice input is started, the terminal apparatus 1 according to the second modification sets the time point at which it is determined that the gap L between the mouth corners is smaller than or equal to the predetermined distance or it is no longer capable of determining the image of the mouth from the image information as a timing for ending the voice input.

In the second modification, the gap L between the mouth corners is not limited thereto so long as the length of the subject is determinable from the image information. For example, in the second modification, a change in the distance between the terminal apparatus 1 and the speaker may be detected based on the distance between the speaker's ears, the distance between the speaker's eyes, the size (width) of the entire mouth, the size (width) of the nose, or the size (width) of the face determined from the image information.

For example, in the first exemplary embodiment, the camera 14 may be provided in the vicinity of the microphone 13, that is, at the lower side of the terminal apparatus 1. In this case, the camera 14 acquires the image of the speaker's mouth even in a state where the speaker has his/her ear in contact with the terminal apparatus 1. As described above, the operation related to the speech output by the speaker may be detected based on the image of the mouth or the distance from the subject determined from the image information, and a voice command according to the voice information may be performed.

Third Exemplary Embodiment

Figure 7A:
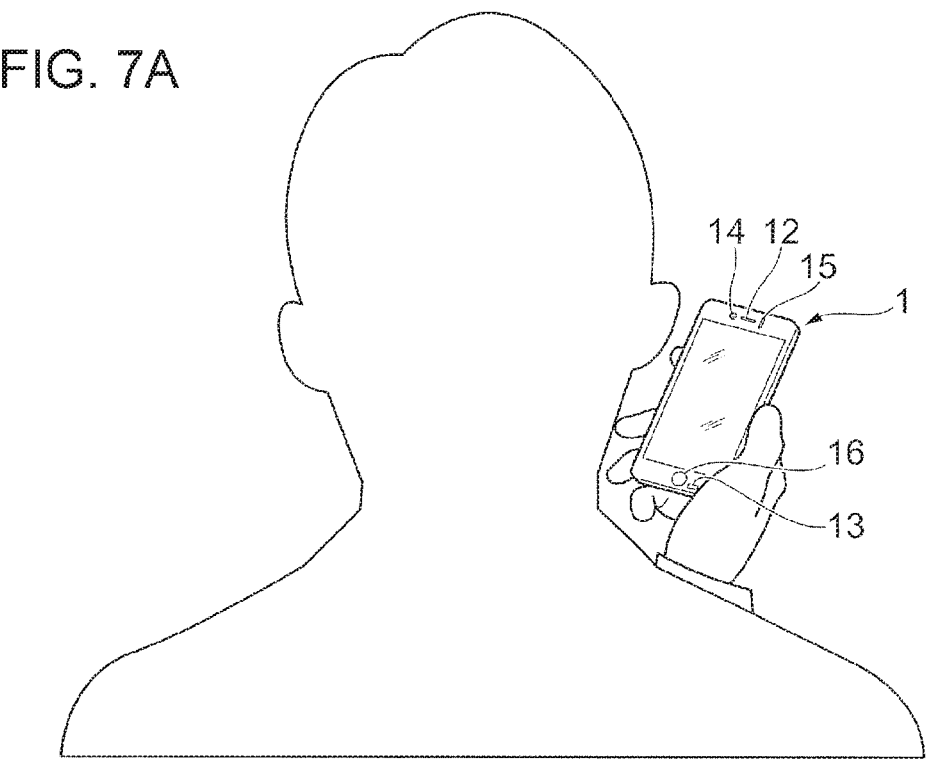
FIGS. 7A and 7B illustrate a process of a voice command performed in a terminal apparatus according to a third exemplary embodiment.
Figure 7B:
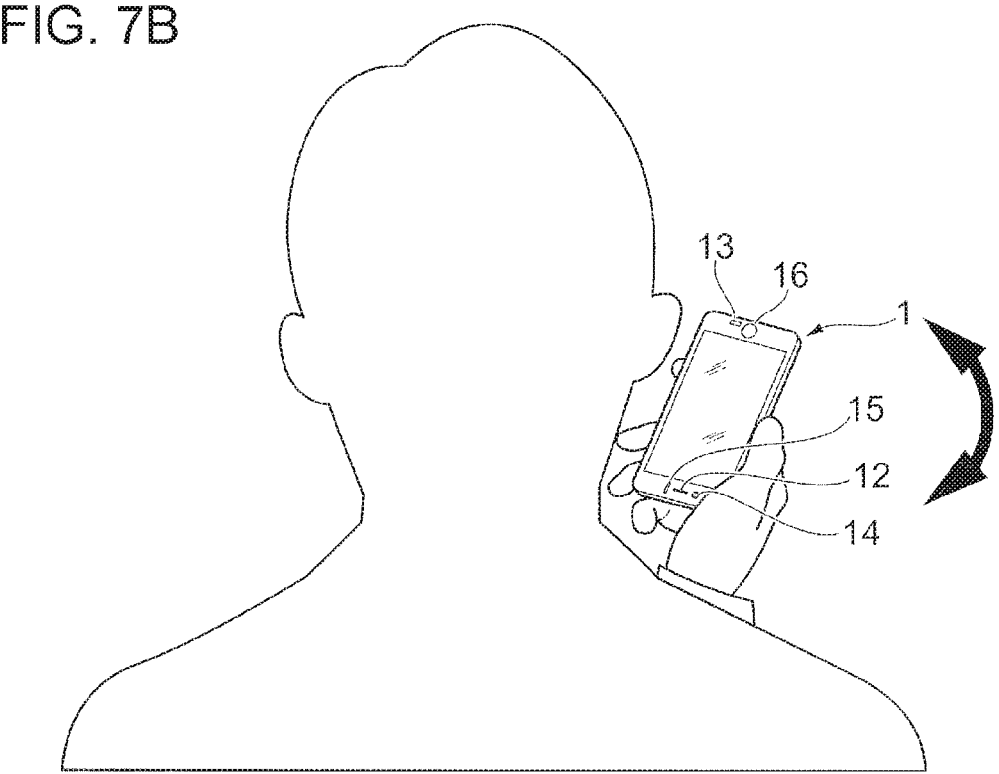

FIGS. 7A and 7B illustrate a process of a voice command performed in a terminal apparatus 1 according to a third exemplary embodiment.

Next, a simple input function of the terminal apparatus 1 according to the third exemplary embodiment will be described. In the third exemplary embodiment, components similar to those in the other exemplary embodiments are given the same reference signs, and detailed descriptions thereof are omitted.

As shown in FIG. 7A, in the third exemplary embodiment, it is assumed that a speaker performs a voice command in a state where the speaker holds the terminal apparatus 1 in contact with one of his/her ears. However, since the terminal apparatus 1 according to this exemplary embodiment has the camera 14 disposed at the upper side of the terminal apparatus 1, as shown in FIG. 7A, it is difficult for the camera 14 to acquire an image of the speaker's mouth.

As shown in FIG. 7B, in the third exemplary embodiment, the terminal apparatus 1 is used by being inverted to an upside-down state. By inverting the terminal apparatus 1 to an upside-down state, the camera 14 is positioned at the lower side. This makes it easier for the camera 14 to acquire an image of the speaker's mouth.

In the third exemplary embodiment, the predetermined operation for starting a voice command (i.e., step S101 in FIG. 6) is performed by inverting the terminal apparatus 1 to an upside-down state. In this case, the gyroscope 105 determines whether or not the terminal apparatus 1 is inverted to an upside-down state. In the third exemplary embodiment, the terminal apparatus 1 switches to a mode for performing a voice command by being inverted to an upside-down state.

Similar to the first modification, the amount of movement in the image of the speaker's mouth is detected in the third exemplary embodiment. For example, the amount of movement in a distinctive area of the mouth, such as the upper lip or the lower lip, is calculated, and a period in which the image of the mouth is detected as having a predetermined amount of movement or more is set as a speech period.

The terminal apparatus 1 according to the third exemplary embodiment sets the time point at which it is determined that the mouth is moving by a predetermined amount or more in image information acquired by the camera 14 as a timing for starting voice input. Moreover, after the voice input is started, the terminal apparatus 1 according to the third exemplary embodiment sets the time point at which it is determined that the mouth is no longer moving by the predetermined amount or more in the image information acquired by the camera 14 as a timing for ending the voice input.

By inverting the terminal apparatus 1 to an upside-down state, the loudspeaker 12 is positioned at the lower side and the microphone 13 is positioned at the upper side. Specifically, the camera 14 and the loudspeaker 12 face the speaker's mouth, whereas the microphone 13 faces one of the speaker's ears.

In the third exemplary embodiment, the functions of the loudspeaker 12 and the microphone 13 are switched to the state prior to inverting the terminal apparatus 1 to an upside-down state. Specifically, in the terminal apparatus 1 according to the third exemplary embodiment, control is performed such that the loudspeaker 12 acquires voice information and the microphone 13 outputs a voice. The basic hardware configurations of the loudspeaker 12 and the microphone 13 are the same. Therefore, in the third exemplary embodiment, the functions of the loudspeaker 12 and the microphone 13 are changed in accordance with software-based control. Then, a voice signal is generated by detecting vibration based on the speaker's voice by using the diaphragm of the loudspeaker 12, and a voice is output by causing the diaphragm of the microphone 13 to vibrate.

In the third exemplary embodiment, the voice input may be started when the terminal apparatus 1 is inverted to an upside-down state. In this case, after the voice input is started, the terminal apparatus 1 may determine the timing for ending the voice input based on the speaker's speaking status determined from image information acquired by the camera 14.

Accordingly, in the third exemplary embodiment, the speaker does not have to perform an operation other than simply speaking into the terminal apparatus 1 in a state where the speaker holds the terminal apparatus 1 in contact with one of his/her ears, such that voice input is automatically completed.

In this exemplary embodiment, the timings for both starting and ending the voice input are determined based on the state of the speaker outputting the speech. Alternatively, only one of the timings may be determined. In this case, when the speaker is to make a voice command, for example, the number of operations performed by the speaker is reduced, thereby facilitating user's operation.

Furthermore, although the terminal apparatus 1 according to the first exemplary embodiment is plate-shaped as an example, the shape and the mode during use are not limited to those described in the exemplary embodiment. For example, the terminal apparatus 1 is not limited to a portable type, as in a so-called portable terminal, and may be of a type that is used by being set on, for example, a table. Moreover, the terminal apparatus 1 may have a shape different from that in the exemplary embodiments, such as a cylindrical shape, an elliptical shape, or a prismatic shape.

The simple input function described above may be regarded as a program. Moreover, a program for causing a computer to realize the simple input function may be provided via, for example, a communication unit or may be provided by being stored in various types of storage media.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    an acquiring unit that acquires voice information of a speaker;
    a detecting unit that detects operation related to speech by the speaker; and
    a voice command unit that performs a voice command in accordance with the voice information acquired by the acquiring unit after the detecting unit detects the operation;
    wherein the detecting unit detects the operation based on a change in a distance between the information processing apparatus and the speaker.

2. The information processing apparatus according to claim 1,
    wherein in a case where the operation is no longer detected by the detecting unit, the voice command, unit performs the voice command by using the voice information acquired from the acquiring unit before the operation is no longer detected.

3. The information processing apparatus according to claim 1,
    wherein the detecting unit detects the operation based on an image of the speaker speaking to the information processing apparatus.

4. The information processing apparatus according to claim 3,
    wherein the detecting unit detects an image of a mouth of the speaker.

5. The information processing apparatus according to claim 3,
    wherein the detecting unit detects movement of a mouth of the speaker.

6. The information processing apparatus according to claim 1,
    wherein the detecting unit determines the change in, the distance by using light having a predetermined wavelength.

7. The information processing apparatus according to claim 1,
    wherein the detecting unit determines the change in the distance based on a size of a subject in a photographed image of the speaker.

8. The information processing apparatus according to claim 1,
    wherein the detecting unit acquires an image of a mouth of the speaker in a state where the information processing apparatus is inverted to an upside-down state.

9. The information processing apparatus according to claim 8, further comprising:
    a loudspeaker and a microphone,
    wherein the loudspeaker serves as the acquiring unit to acquire the voice information, and the microphone outputs sound.

10. The information processing apparatus according to claim 8,
    wherein the voice command unit starts acquiring the voice information from the acquiring unit for the voice command when the information processing apparatus is inverted to the upside-down state.

11. The information processing apparatus according to claim 1,
    wherein the detecting unit is a camera provided at a lower side of the information processing apparatus.

12. An information processing apparatus comprising:
    an acquiring unit that acquires voice information of a speaker;
    a detecting unit that detects operation related to speech by the speaker; and
    a voice command unit that performs a voice command in accordance with the voice information acquired by the acquiring unit at a timing determined from the operation detected by the detecting unit,
    wherein the detecting unit detects the operation based on a change in a distance between the information processing apparatus and the speaker.

* * * * *